United States Patent [19]
Fujio

[11] 3,815,061
[45] June 4, 1974

[54] AUTOMATIC CONTROL CABLE ASSEMBLY

[75] Inventor: Fumio Fujio, Nishinomiya, Japan

[73] Assignee: Nippon Cable Systems Inc., Hyogo, Japan

[22] Filed: Jan. 26, 1973

[21] Appl. No.: 326,788

[30] Foreign Application Priority Data
Sept. 11, 1972 Japan.............................. 47-91082
Dec. 1, 1972 Japan............................. 47-120871

[52] U.S. Cl................. 335/145, 123/119, 335/164, 335/170
[51] Int. Cl. .......................................... H01h 47/04
[58] Field of Search......... 307/10 R; 180/77 R, 108; 335/66, 145, 164, 170; 123/119 F

[56] References Cited
UNITED STATES PATENTS
1,974,488  9/1934  Geraghty ........................... 335/164
2,179,141  11/1939  Thompson ...................... 123/119 F
3,109,906  11/1963  Abendroth ......................... 335/170

Primary Examiner—Harold Broome
Attorney, Agent, or Firm—Armstrong, Nikaido & Wegner

[57] ABSTRACT

An automatic control cable assembly for operating various engine mechanisms of automobile, ship and other industrial machines, by remote control. The assembly is constructed so that an inner cable in the assembly is fixed to the operated position until the conditions required in the various engine mechanisms are satisfied, and said inner cable is automatically restored to its original position when the above conditions are satisfied.

7 Claims, 13 Drawing Figures

3,815,061

AUTOMATIC CONTROL CABLE ASSEMBLY

BRIEF SUMMARY OF INVENTION

The present invention relates to a novel automatic control cable assembly for operating various engine mechanisms of automobile, ship and other industrial machines, by remote control, particularly to an assembly constructed so that an inner cable in the assembly is fixed to the operated position until the conditions required in the various engine mechanisms are satisfied, and said inner cable is automatically restored to its original position when said conditions are satisfied.

DESCRIPTION OF THE PRIOR ART

When idling of car engine is carried out, an inner cable of a control cable for operating choke mechanism hitherto has been operated to decrease intake to the engine and make the engine start smoothly. And then the inner cable is restored to its original position to increase intake to the engine when the temperature of the engine rises to a suitable extent. In case restoring operation of the inner cable is not done on this suitable occasion, overintake of gasoline due to insufficiency of intake is brought out. It tends to bring engine trouble caused by stained cylinder and ignition plug which are brought out by overintake of gasoline, and bring nuisance of exhaust gas caused by imperfect combustion of gasoline.

OBJECTS OF THE INVENTION

An object of the present invention is to provide an automatic control cable assembly in which an inner cable is fixed to the operated position until the conditions required in the various engine mechanisms of automobile, ship and other industrial machines are satisfied, and the inner cable is automatically restored to its original position when the conditions are satisfied.

Another object of the invention is to provide an automatic control cable assembly in which operating distance of the inner cable is optionally adjustable even while the inner cable is maintained at the operated position.

Further object of the invention is to provide an automatic control cable assembly which can prevent engine trouble caused by stained cylinder and ingition plug which are brought out by overintake of gasoline.

Still further object of the invention is to provide an automatic control cable assembly which can prevent imperfect combustion of gasoline.

These and other objects and advantages of the invention will be apparent from the following description and appended drawings.

DETAILED DESCRIPTION

Figure 1:
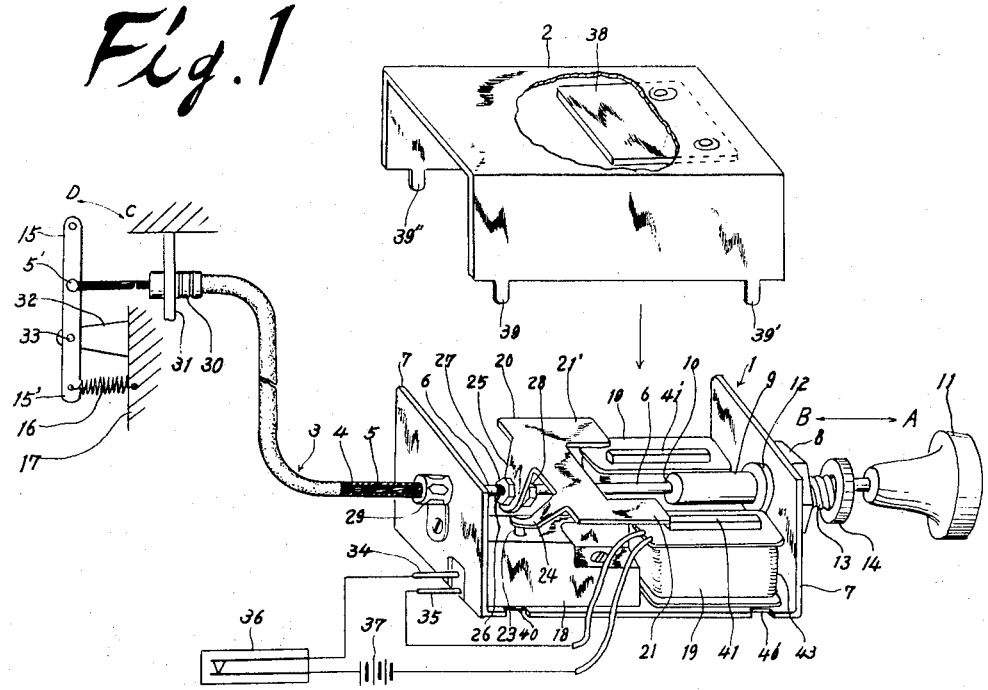
FIG. 1 is an oblique projection drawing showing the principal part of an embodiment of the present invention.

Referring now to FIG. 1, there is shown an automatic control cable assembly 1 provided with the cover 2 and a known control cable 3. The control cable 3 consists of a flexible conduit tube 4 and a flexible inner cable 5 which is slidably inserted through the conduit tube 4.

A shaft 6 is fixed to one end of the inner cable 5, and is led out from the casing 7 through a hole 10 of a guide member 9 fixed to the casing 7 by a nut 8, and is provided with a knob 11 at other end thereof.

The guide member 9 is provided with a brim 12 and a threaded part 13, and is fixed to the casing 7 by the brim 12 and the nut 8 so as to pinch the casing 7.

The casing 7 is fixed to a car body and others between the nut 8 and the nut 14 driven through the threaded part 13.

Choke mechanism and others are connected to the other end of the inner cable 5, and in that embodiment the above-mentioned mechanism is simply represented by a lever 15.

The lever 15 is supported in rotatable manner at its suitable position by a shaft 33 which is fitted to the supporting member 32 fixed to the body 17, and is connected to the end 5' of the inner cable 5 on one side thereof. A return spring 16 is fitted between the body 17 and the other end 15' of the lever 15 so as to pull the end 15' toward the body 17 at all times.

A compact on-off switch 18 and a magnet 19 are fixed to the casing 7 as shown in FIG. 1.

The magnet 19 is compact and of horseshoe type.

The shaft 6 and the guide member 9 are arranged between the face 41 and face 41' of the magnet.

The member 20 for being attracted by the magnet 19 is made of iron and other material, and has elongated parts 21 and 21', a tongue 24 which presses and releases the projection 23 to operate the switch 18, and a bending arm 25 fixed to the shaft 6.

The arm 25 having a hole at the tip thereof is fixed to the shaft 6 by the nuts 27 and 28 driven through the threaded part 26 of the shaft 6 passing through the hole.

The control cable 3 is fixed to the casing 7 and the plate 31 by the caps 29 and 30 fitted at the both ends of the conduit tube 4.

An electric wire 34 from the switch 18 is led to thermoswitch 36, and an electric wire 35 is led to the thermoswitch 36 from an electric battery 37 through the coil 43 of the magnet 19.

The cover 2 provides with a part 38 made of iron which is fitted to its internal face with some clearance and claws 39, 39', 39'', . . . engaging with the recesses 40, 40', . . . of the casing 7 at its lower end. The claws are bent at the rear face of the casing 7 to fix the cover 2 to the casing 7 after engaging with the recesses.

The operation of this embodiment according to the present invention will now be described.

Figure 2:
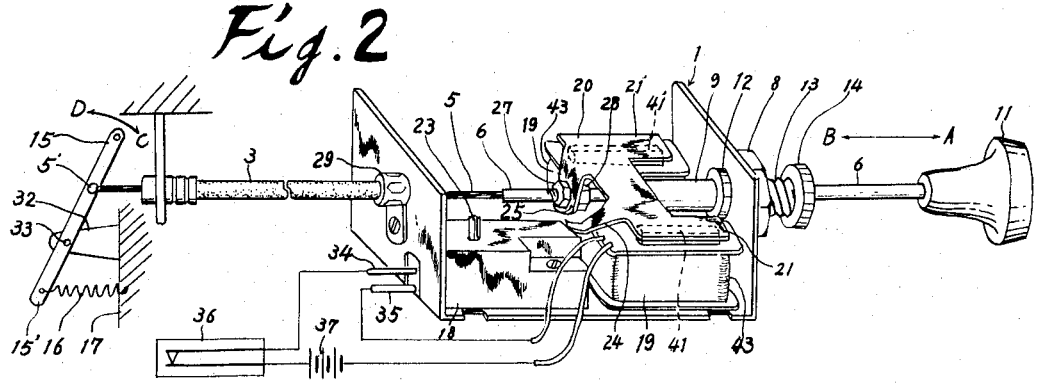
FIG. 2 is a view similar to FIG. 1 but showing the case that the shaft is at the operated position.

As shown in FIG. 2, when the knob 11 is pulled in the direction A, the shaft 6, the inner cable 5 fixed to the shaft 6 and the other end 5' of the cable 5 are pulled, and accordingly the lever 15 is pivoted in the direction C.

The member 20 mounted on the shaft 6 is simultaneously moved in the direction A and slides on the two faces 41 and 41' of the magnet 19.

Figure 5:
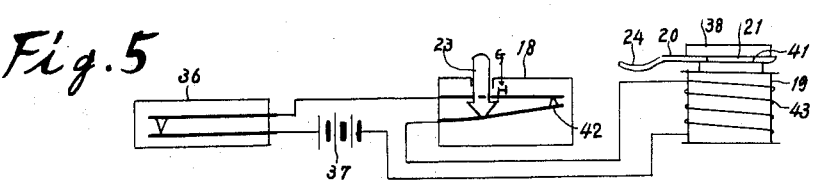

Since the tongue 24 is released from the projection 23 at that time, the projection 23 is raised in the direction G to close the circuit in the switch 18, as shown in FIG. 5.

Figure 4:
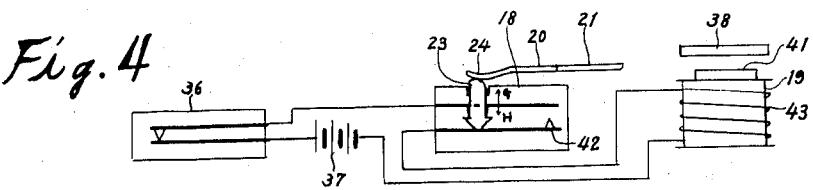
FIGS. 4 to 7 are schematic views showing various operating conditions.

FIG. 4 is a schematic circuit diagram showing the condition of FIG. 1 in which the thermoswitch 36 is closed, the projection 23 of the switch 18 is pressed down by the tongue 24 of the member 20 to open the circuit of the switch 18 and an electric current does not flow through the magnet 19.

FIG. 5 shows a condition which the knob 11 is pulled in the direction A, the tongue 24 of the member 20 is apart from the projection 23 of the switch 18, the projection 23 is raised in the direction G to close the switch 18, the elongated parts 21 and 21' of the member 20 is on the face 41 and 41' of the magnet 19 and an electric current from the battery 37 flows through the coil 43 of the magnet 19 to attract the member 20 and the part 38, and to fix the member 20 in the pinched manner between the magnet 19 and the part 38.

The shifting distance of the shaft 6 in the direction A is adjustable according to the operation of the choke mechanism.

Even if only a part of the elongated parts 21 and 21' is fixed in the pinched manner as the above-mentioned, the magnet 19 has sufficient magnetism for the parts 21 and 21' not to be restored to its original position by the return spring 16, and therefore the choke mechanism is operated as described above.

Figure 3:
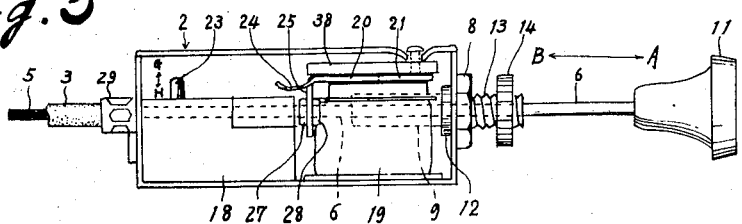
FIG. 3 is a front view of FIG. 2.

FIG. 2 and FIG. 3 show the assembly in detail in the condition shown in FIG. 5. When the shaft 6 is pulled in the direction A, the lever 15 is pivoted in the direction C to operate the choke mechanism (not shown) and to rotate the engine smoothly. As shown in FIG. 5, the switch 18 is closed and the magnet 19 is magnetised by an electric current from the battery through the thermoswitch 36 being closed, so that the member 20 mounted on the shaft 6 and the part 38 (shown in FIG. 3) are attracted to the faces 41 and 41' of the magnet 19 to fix the member 20 between the magnet 19 and the part 38 (part 38 is not shown in FIG. 2).

As mentioned above, the part 38 is fitted to the inner face of the cover 2 with some clearance so as to be inclined longitudinally and transversely to a certain extent. Accordingly, even if the cover 2 is not mounted on the casing 7 accurately, the part 38 is properly brought into contact with the member 20 by the magnet 19 so as to fix the member 20 between the part 38 and the faces 41 and 41' by the constant magnetism.

The knob 11 can be pulled by hand according to demand, while the member comes in contact with the surface so that the shaft 6 is at desired operating position. This matter is strongly required in this kind of apparatus. In operating choke mechanism, for example, intake to the engine must be adjusted according to the temperature thereof. (Idling will not be sufficiently carried out without adjusting intake to the engine, that is, the operating of the shaft 6, and nuisance of exhaust gas by imperfect combustion of gasoline will be brought out, as mentioned above, due to shortage of intake.)

Figure 6:
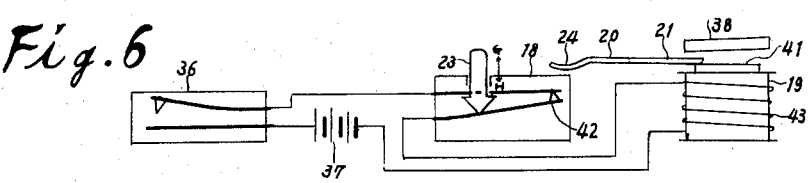
Figure 7:
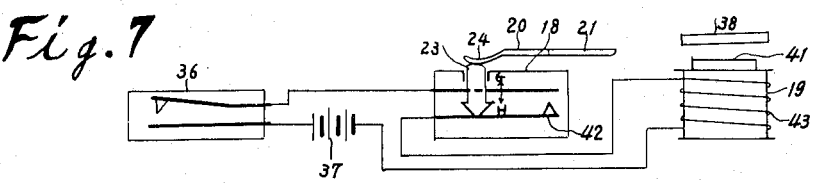

When the temperature of engine is raised suitably during the idling of the engine in a condition shown in FIG. 5, the thermoswitch 36 perceives the temperature to open the switch 36, to cut off an electric current and to remove magnetism from the magnet 19 as shown in FIG. 6, and therefore the shaft 6 and the member 20 are pulled by the return spring 16 in the direction B to restore themselves to the original position shown in FIG. 1 automatically, and the projection 23 of the switch 18 is again pressed down by the tongue 24 to open the switch 18 as shown in FIG. 7. In that case, the thermoswitch 36 is left open while the temperature of engine is high, and when the engine is stopped and cooled, the thermoswitch 36 and the switch 18 are brought into the condition shown in FIG. 4, that is, the thermoswitch 36 is closed and the switch 18 is opened to carry out next idling operation.

Even if the knob 11 is pulled in the direction A when the engine maintains at a suitable temperature, the knob 11 is restored to its original position because the thermoswitch 36 is opened and an electric current does not flow through the magnet 19. In that case, when the temperature of engine is high, the operation of choke mechanism is not conveniently required but injurious, as above-mentioned.

Various switches operated by a variation of physical properties such as wind pressure, hydraulic pressure, illumination and gravity may be used for the switch 18.

Another embodiment of the present invention will now be described. Referring now FIG. 8 which shows the assembly before operation, there is shown a known control cable 3 comprising a flexible outer tube 4 and a flexible inner cable 5 being slidably inserted through the tube 4. The inner cable 5 consists of a twisted steel wire and others.

One end of the outer tube 4 is fixed to a metal cap 44 which is fixed to the casing 45.

A shaft 6 for operation which extends through the casing 45 is fixed to one end of the inner cable 5. A member 46 for being attracted by a magnet is fitted to the suitable position of the shaft 6 with some clearance by screws 47 and 47'.

A pin 48 is mounted on the suitable position of the shaft 6 and a return spring 49 is fitted between the pin 48 and the casing 45 so as to pull always the shaft 6 in the direction A.

A magnet 50 is fixed to the casing 45 and its face 51 is against the member 46. When a knob 11 fixed to an end of the shaft 6 is pulled to operate the shaft 6 in the direction B, the member 46 slides on the face 51.

The shaft 6 is slidably supported by a boss 52 having a hole 53 which is screwed into the casing 45. The casing 45 is fixed to a plate 54 by a nut 55 driven through the threaded part 56 on the outer periphery of the boss 52.

A switch 57 such as timer or others keeps close a switch 58 during the time required, when the lever 59 is pivoted.

A battery 60 is used to operate the magnet 50 and the wires from the battery 60 to the switch 57 and the magnet 50 are shown by dotted lines.

Other end of the inner cable 5 is fixed to the mechanism (not shown) such as choke mechanism of car engine and others. When the knob 11 is pulled in the direction B, the shaft 6 and the inner cable 5 are pulled to operate the mechanism.

Figure 8:
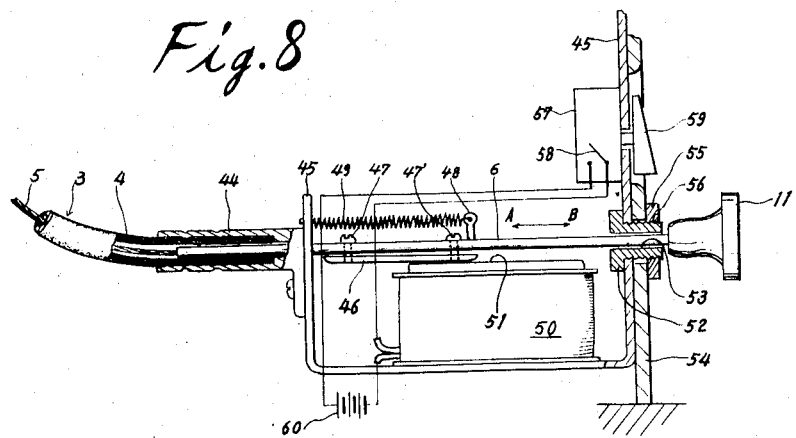
FIG. 8 is a front view showing the principal part of other embodiment of the present invention.

As shown in FIG. 8, even if the member 46 is moved fully in the direction A, its end is on the face of the magnet 50 so that the member 46 is attracted by the magnet 50 against the return spring 40.

Figure 9:
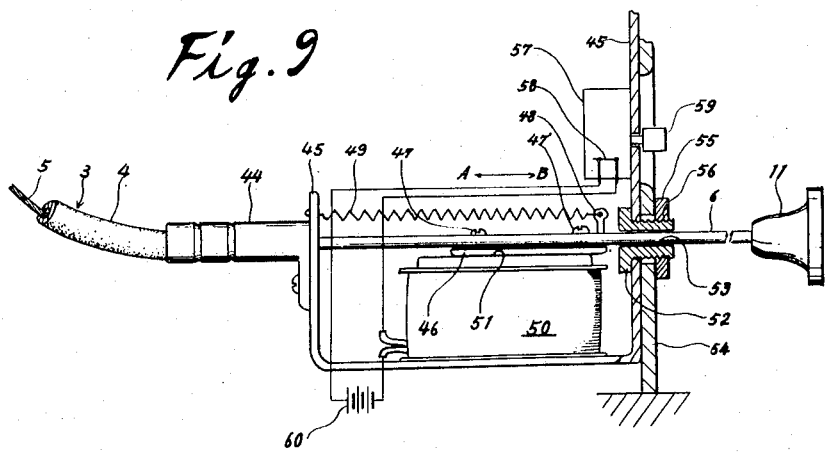
FIG. 9 is a view similar to FIG. 8 but showing the case that the shaft is at the operated position.
Figure 10:
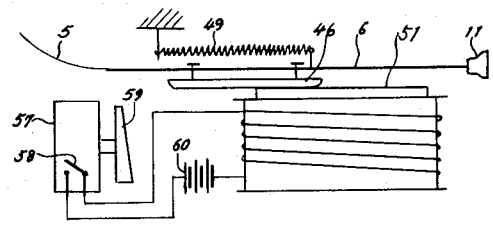
FIGS. 10 to 13 are schematic views showing various operating conditions.
Figure 11:
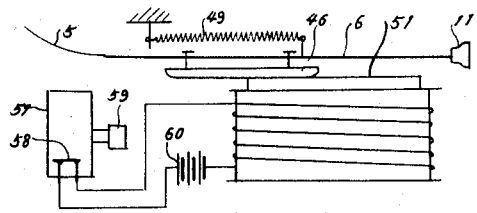
Figure 12:
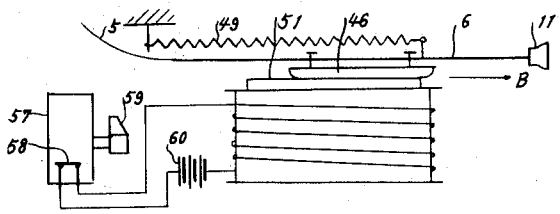
Figure 13:
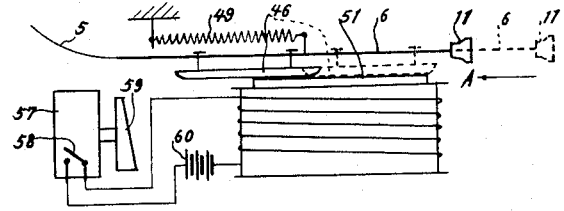

The operation of this embodiment will now be described referring to FIG. 9 to 13. As shown in FIG. 9, when the lever 59 of the switch 57 is pivoted to set a time as desired, the switch 58 is closed and an electric current flows to the magnet 50 from the battery 60 (See FIG. 11). Subsequently, when the knob 11 is pulled in the direction B, the member 46 fixed to the shaft 6 is attracted by the face 51 of the magnet 50 so as to fix the shaft 6 in the operated position against the return spring 49 (see FIG. 12) even if the knob 11 is set free from hand. Accordingly, the mechanism such as the choke mechanism is operated by the inner cable 5 fixed to the shaft 6.

When the switch 58 is opened after the predetermined time (see FIG. 13), an electric current through the magnet 50 from the battery 60 is stopped, whereby the member 46 becomes free from the magnet 50. Accordingly, the shaft 6 is pulled in the direction A by a return spring 49 to be restored to its original position shown in FIG. 8 and FIG. 10 and the mechanism to be operated is restored to its original position.

In the assembly of the present invention, it is required that the knob 11 can be fixed to the desired position within the operating distance, and the knob 11 can be operated as desired even if the switch 58 is closed, and further the shaft 6 is not moved from the operated position by vibration, and the like. Since the shaft 6 is remained at rest at the operated position through the member 46 attracted by the magnet 50 in the present assembly, the knob 11 can remain at rest at the desired position within the operating distance, and, while the member 46 comes in contact with the face 51, the knob 11 can be also operated in the direction A or B so as to bring the mechanism to be operated into the desired condition. Since the member 46 is fitted to the shaft 6 with some clearance, even if some errors are in the gap and parallelism between the shaft 6 and the face 51 of the magnet, the former can tightly contact with the face 51. Accordingly, the shaft 6 can remain at rest at the desired position against vibration, or the like.

And further, there is another advantage that severe accuracy is not required in assembling the present apparatus.

In this embodiment the switch 57 operated by timer is described, but various switches operated by a variation of physical properties such as temperature, pressure, gravity and others may be used for the switch 57.

It is not necessarily to fix the switch 57 to the casing, and the switch 57 may be fitted to the desired position. The switch 57 may be operated accompanying with operation of the shaft 6 to open and close the switch 58.

As already described, an automatic control cable assembly of the present invention has various advantages, which will be summarized below:

1. The shaft can be remained at rest at the operated position until the condition required in the mechanism to be operated is satisfied, and automatically returned to its original position when the condition is satisfied.

2. The shaft being placed at an operating position can be moved to the desired position.

3. The shaft is not easily moved by vibration, and the like from the operated position since the member fixed to the shaft is attracted by the magnet.

4. The assembly is compact and severe accuracy is not required when assembled.

It will be understood that the embodiments of the invention herewith shown and described are preferred examples and that various modifications may be carried out without departing from the spirit of the invention or from the scope of the claims.

What is claimed is:

1. An automatic control cable assembly comprising:

a. a control cable;
   b. an operating shaft having one end connected to an inner cable of said control cable and the other end connected to a knob means, said operating shaft being manually movable between first and second positions;
   c. a casing slideably supporting said shaft;
   d. a member mounted on said shaft;
   e. holding means consisting essentially of electromagnet means positioned with respect to said shaft and said member on said shaft for holding said member and thereby said shaft at any point between said first and second position when said electromagnet means is energized;
   f. condition responsive switch means in series with said electromagnet means for energizing said electromagnet means in response to a sensed condition and thereby holding said shaft means at the position to which it has been moved as long as said condition is sensed; and
   g. return spring means for returning said shaft to its first position when said condition is not sensed.

2. The automatic control cable assembly of claim 1 further including on-off switch means in series with said condition responsive switch means and said electromagnet means, said on-off switch means being positioned with respect to said member such that said on-off switch means is open when said shaft is in its first position and is closed when said shaft is moved towards its second position.

3. The automatic cable assembly of claim 2 wherein said member has a tongue for engaging said on-off switch means when said shaft is in its first position.

4. The automatic control cable assembly of claim 1 wherein said electromagnet means consists essentially of an electromagnet and a holding part, wherein said member is held between said electromagnet and said holding part when said holding part is drawn towards said electromagnet by the energization thereof.

5. The automatic cable assembly of claim 1 wherein said electromagnet means consists essentially of an electromagnet wherein said member is attracted to and held by said electromagnet when said electromagnet is energized and said shaft has been moved from its first position.

6. The automatic control cable assembly of claim 1 wherein said condition responsive switch means comprises a timer operated switch.

7. The automatic control cable assembly of claim 1 wherein said condition responsive switch means comprises a temperature sensitive switch.

* * * * *